May 22, 1945.  E. ORSHANSKY, JR  2,376,804
BOOSTER UNIT
Filed April 4, 1942  2 Sheets-Sheet 1

INVENTOR.
Elias Orshansky, Jr.
BY
ATTORNEYS

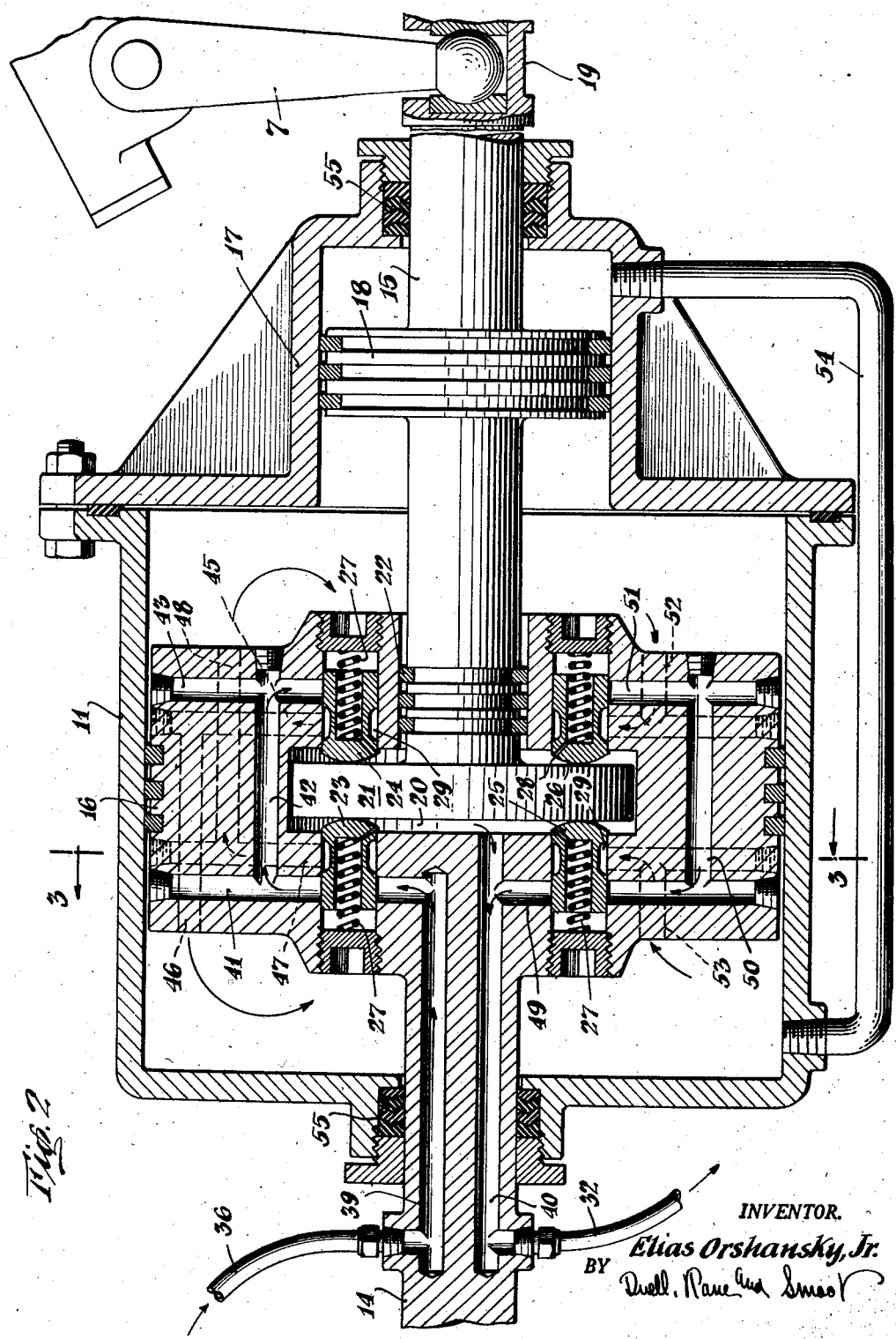

UNITED STATES PATENT OFFICE 2,376,804

BOOSTER UNIT

Elias Orshansky, Jr., Cleveland Heights, Ohio, assignor to The Aerotorque Company, Cleveland, Ohio, a corporation of Connecticut Application April 4, 1942, Serial No. 437,671

4 Claims. (Cl. 121—41)

This invention relates to a structurally and functionally improved booster unit.

In its more specific aspects, it is an object of the invention to provide a unit of this type and which will operate—in certain aspects—in an improved manner over the unit or control illustrated in my prior United States Patent 2,244,850 of June 10, 1941, and which will, moreover, present an improved structure over that disclosed in such prior patent.

A further object of the invention is that of furnishing a booster unit which will be of particular value when employed as a steering control or booster. As such, it may readily be applied to vehicles as trucks, automobiles, etc., and will enable the operator, with minimum effort, to control the path of movement of the vehicle over a surface to be traversed.

An additional object is that of providing a booster unit particularly intended for use in connection with vehicles and which, when so employed, will enable the operator to "feel" the control and reaction of the wheels being steered in the same manner as commonly occurs today under full manual steering conditions; such control, however, serving to relieve the operator of the expenditure of any substantial energy in steering the vehicle.

An additional object is that of furnishing a steering booster or control unit of the power type but which, in the event of power failure, will permit the operator to manually control the operation of the steering wheels or their equivalents and without any substantially increased operator effort being necessary over that which would have been required had the control unit not been applied to the vehicle. Accordingly, it will be feasible to readily operate the control to which the booster unit is applied and in the event of power failure.

With these and other objects in mind, reference is had to the attached sheets of drawings illustrating one practical embodiment of the invention, and in which:

Fig. 2 is a sectional side view of such unit taken along line 2—2 of Fig. 3.

Figure 1:
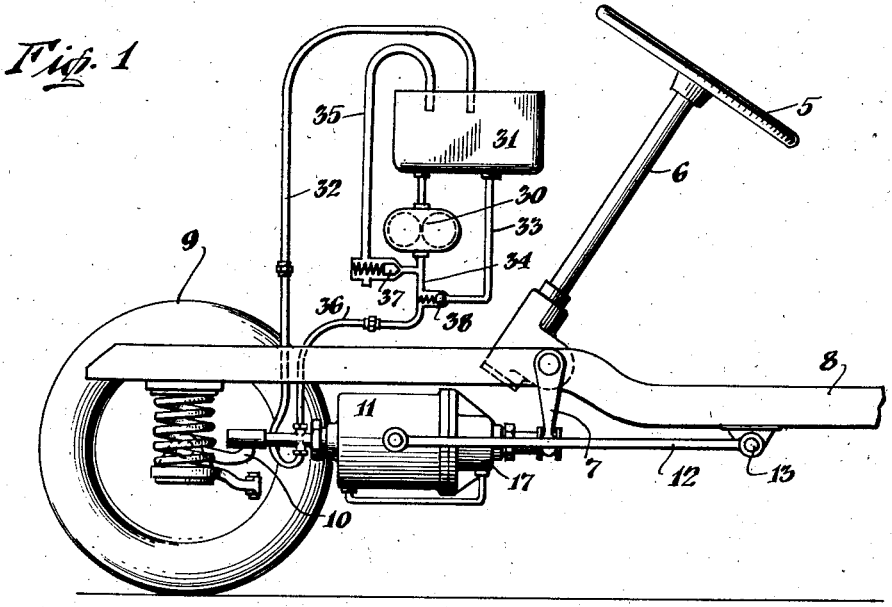
Fig. 1 is a diagrammatic side view of the forward portion of a vehicle and showing the unit applied thereto.

With primary reference to Fig. 1, the numeral 5 indicates the steering wheel supported adjacent the upper end of column 6 and from the housing of which a pitman arm 7 extends. These units are supported by the frame 8 of the vehicle which has dirigibly mounted wheels 9 so that it may be steered. A steering link 10 may be suitably connected with these wheels and be coupled to a member which extends into the interior of a control cylinder 11. A similar member may extend to the opposite end of the cylinder and be connected to the piston 17. The cylinder is mounted to be substantially free of sidewise swinging movements although it preferably should be capable of movement in a vertical plane. To this end, it is conveniently mounted by one or any suitable number of links 12 pivotally attached to the same, as indicated at 13.

Now, referring to Fig. 2, it will be seen that the two members which extend from the cylinder 11 may be in the form of rods 14 and 15. The former is connected in any desired and acceptable manner with the link 10. The latter is coupled in a similar manner (as, for example, by a ball and socket joint 19) with the pitman arm 7.

A piston, generally indicated at 16, is mounted for reciprocation within the cylinder 11. This piston is coupled to the rod 14. The cylinder casing 11 may be extended as indicated at 17 to provide what might be termed a subsidiary cylinder portion. A piston 18 is affixed to rod 15 and is disposed within this cylinder portion.

Also affixed to rod 15, and disposed within a space 20 formed in cylinder 16, is what might be termed a control member 21. This member, which may comprise simply a head portion is affixed to rod 15. Rings or packing material 22 may be mounted by the rod 15 and engage the bore of piston 16 through which this rod extends and in order to prevent leakage at that point.

Extending into chamber of space 20 of the piston 16 are the heads of valve members 23, 24, 25, and 26. Each of these members may have associated with it a spring 27 which will cause it to yieldingly bear against the control member. Also, each of these members is preferably formed with a venting bore or opening 28 through its head. As will be additionally observed, each of these members is preferably of more or less identical construction, so that these parts may be interchangeable; each of them being formed with a reduced portion 29 providing a passage for the flow of fluid.

Now, returning to a consideration of Fig. 1, it will be seen that the reference numeral 30 indicates a pump of any suitable design and which may conveniently be driven by the prime mover of the vehicle. This pump, as well as the remaining parts hereinafter described, has been somewhat diagrammatically illustrated in the figure in qestion in order that the general construction and operation of these parts may be clearly visualized. Thus, the numeral 32 indicates a discharge line extending from the booster unit and to a tank 31. A line 33 may also extend from this tank and be connected to the line 34 within which the pump unit 30 is interposed. This line is in turn connected to a supply line 36 coupled to a booster unit. A further line 35 may be connected to line 34 and extend to tank 31. A safety valve 37 is conveniently interposed in this line. A check valve 38 is preferably interposed in line 33. The operation of these several parts will be hereinafter more especially brought out. In the interim, suffice it to say that line 36 supplies fluid under pressure (for example, 100 to 150 lbs. per square inch) to the booster unit, and line 32 serves as a return for the fluid flowing from the unit.

Figure 3:
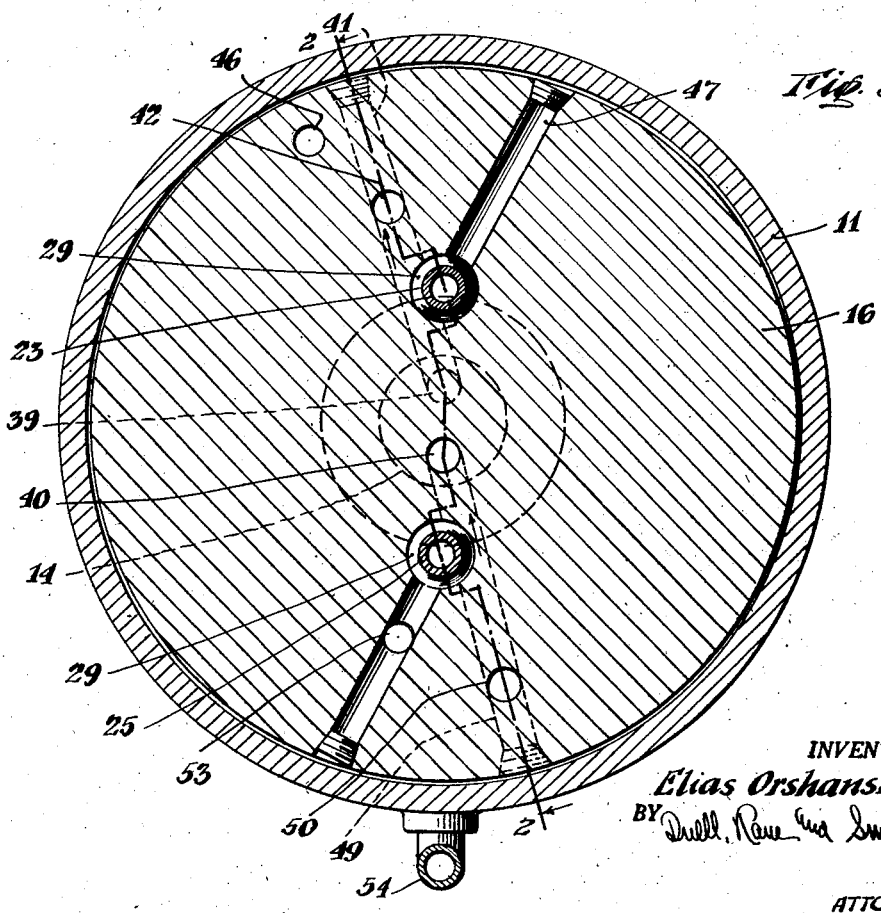
Fig. 3 is a transverse sectional view taken along the lines 3—3 and in the direction of the arrows as indicated in Fig. 2.

Now referring to Fig. 2, it will be noted that line 32 is coupled to a bore 40 in rod 14. Line 36 is connected to a bore 39 also formed in this rod. Bore or passage 39 is connected with a passage 41 formed in piston 16. This passage 41, which is narrowed without being blocked by the projection of a portion of valve 23 therein (see Fig. 3), in turn is connected by a passage 42 with a passage 43, the flow through which is controlled by valve 24. When this valve is shifted to a proper position, fluid may flow from the passage 43 to passage 45 through the reduced or channel portion 29 of the valve. The passage 45 communicates with passage 46 discharging to the left of piston 16 as viewed in Fig. 2. It is to be noted that fluid under pressure may normally flow through the passage 39 and past the projecting portion of valve 23 in passage 41 to passage 42. However, when valve 23 is shifted and valve 24 is retracted to its normal position, such fluid may flow through passage 47 and so into passage 48 from whence it will discharge into the right hand side of the cylinder as viewed in Fig. 2.

Now returning to a consideration of passage 40, connecting the unit with the discharge line 32, it will be observed that this passage or bore connects with a passage 49 and has its inner end connecting with the space 20 defined by the piston 16. Passage 49, which is narrowed without being blocked by the projection of a portion of valve 25 therein (see Fig. 3), is connected to a passage 50 which, in turn, connects with a passage 51 formed in the piston. The end of the latter is normally closed by the valve 26. A passage 52, communicating with the right hand side of the piston 16, extends to a point adjacent the valve 26 and by shifting the latter may be connected with the passage 51. In its normal position, the valve 25 permits a flow of fluid via actuated valve 26 through passage 49. When shifted, however, and while valve 26 is in its normal position, valve 25 allows such flow to occur through the passage 53 communicating with the left hand side of the cylinder.

Finally, it will be observed, that the left hand side of the cylinder 11 is connected by a passage 54 with the right hand side of the cylinder 17 and the rods 14 and 15 are of substantially the same cross sectional area. Also, packings 55 may encircle the rods adjacent the ends of the cylinder assemblies to prevent an escape of fluid from within the interiors of these cylinders.

Now assuming that the system has been filled with fluid which should preferably be of a low temperature pour-point type (such as, for instance, Sperry fluid as used in aircraft hydraulic systems), it will be understood that no movement of the parts will occur despite the fact that the pump 30 is operating. This will be true so long as the pitman 7 is not shifted and if no movement is imparted to the rods. The only operation which will occur will be that when the pump generates a pressure in excess of that desired, fluid may circulate past valve 37 through line 35 and tank 31 or its equivalent.

If, now, the operator desires to cause a shifting of the wheels 9 in one direction, this will be effected by moving the pitman arm 7 in a clockwise direction. Under these circumstances, it will be understood that a thrust will be exerted to the left upon rod 15. The transmittal of this thrust will not be prevented by the piston 18 because of the limited movement thereof, as disclosed hereinafter. Therefore, such thrust will result in an unseating of valves 23 and 25.

The unseating of valve 23 will allow fluid under high pressure to flow from the bore 39 through bore 41, reduced portion 29 of actuated valve 23, and thence through bores 47 and 48 to the right hand side of the cylinder 11. This will cause pressure to be built up within that side of the cylinder. Consequently, the piston 16 will be forced to the left, as viewed in Fig. 2. Such movement will be entirely permissible because of the unseating of valve 25, which allows a flow of fluid to occur from the left side of cylinder 11 through passages 53 and 40 via reduced portion 29 of actuated valve 25 and passage 49. Consequently, the piston and rod will shift to accordingly shift the link 10 or other element to be driven by the unit. This movement will continue until piston 16 tends to override the position of rod 15 and head 21 as established by the crank 7 or its equivalent. Under these circumstances, valves 23 and 25 close and the parts will remain stationary.

During the foregoing movement of the parts, piston 18 will—as afore stated—have been shifted an amount equivalent to the shifting of the rod 15. Now, as to the pressure built up in the right hand side of the cylinder 11, this pressure reacted upon the adjacent face of piston 18. Such reaction bears the same proportion to the force supplied to rod 14 as the proportion of the effective areas of the two pistons.

If, now, rod 15 is shifted to the right as viewed in Fig. 2, valves 24 and 26 will be opened incident to the engagement between the same and the head 21. The opening of valve 24 will permit fluid under high pressure to flow from line 36 through bore 39, passages 41, 42, and 43, past the reduced portion 29 of the valve 24 and so through passages 45 and 46 to the left hand side of cylinder 11. The opening of valve 26 will permit fluid to enter passage 52 from the right hand side of the cylinder 11 and to flow past the reduced portion 29 thereof through passages 51 and 50, as well as, bores 49 and 40 to line 32. Therefore, piston 16 will move to the right carrying with it rod 14. This movement will continue until the position established by rod 15 has been reached by the piston 16 and its associated parts. At that point, due to the closing of valves 24 and 26, which will occur automatically, the parts will reach a condition of rest.

As the pressure has built up in the left hand side of the cylinder 11, such pressure has been transmitted to the right hand side of cylinder 17 by the passage 54. Consequently, a reaction will be caused on the piston 18 and this reaction will be in proportion to the areas of pistons 16 and 18. Consequently, the driver will always know what force he is applying to the wheel or equivalent control and will have the positive "feel" of the road.

Assuming now that the parts are in the position shown in Fig. 2 and the operator does not desire to shift the steering link or equivalent member connected with the rod 14; morover, assuming that an obstruction is encountered by the wheels 9 such that the rod 14 is shifted: under these circumstances, unless rod 15 is shifted, the latter and its associated parts will remain stationary. Under these conditions, if rod 14 moves to the left, it will cause the piston 16 to correspondingly move. This will result in an unseating of the valves 24 and 26 which will allow fluid under pressure to flow to the left hand side of cylinder 11 and fluid to be exhausted from the right hand side of that cylinder. With rod 15 remaining stationary, this action will continue until valves 24 and 26 again seat. Consequently, the tendency of the rod 14 and its connected parts to shift will be resisted. Simultaneously, fluid will react against the face of piston 18 to render the operator aware of the fact that the rod 14 is endeavoring to shift to a position different from that which he has established by his control of the rod 15. This realization will be transmitted without taxing the strength of the operator in overcoming or endeavoring to overcome the movements of the rod 14.

If rod 14 now tends to move in an opposite direction, it is again obvious that due to the fact of the rod 15 remaining stationary, valves 23 and 26 will be open. With the opening of these valves, pressure will be admitted to the right hand side of cylinder 11 and fluid will be exhausted from the left hand side of this cylinder to thus counteract the tendency or thrust of rod 14. Simultaneously, a reaction will be placed on rod 15 through piston 18, tending to move it to the right, as viewed in Fig. 2, and with a force proportionate to the relative areas of the pistons. Accordingly, the operator will again be warned of the tendency of the parts to move in the direction specified.

Obviously, rod 15 can only move to a limited extent with respect to rod 14. Consequently, piston 18 is unable to override rod 14 and its associated parts. Therefore, the oil pressure will always tend to center the parts in, for example, the manner shown in Fig. 2 and with all valves closed.

Should, for any reason, there occur a failure of oil or fluid pressure, it is obvious that the operator may still control the wheels or equivalent parts connected to the rod 14. To do so, he will simply shift the pitman 7 or equivalent control. This will result in a thrust or pull being exerted upon rod 15. A similar movement will occur on the part of the head 21. Due to the fact that this head bears against the inner end of the valves, it is obvious that only limited movement of the same may occur within space 20. After such relatively minor movement has occurred, it is apparent that a direct mechanical thrust or pull will be transmitted by rod 15 to rod 14. The shifting of the valves to their limit of movement may in practice vary from, for example, 1/16 to 1/8 inch. Consequently, the control will still function satisfactorily as a manual control even with the failure of pressure. At the same time, it will be observed that the valves and passage 40 will operate to drain the oil out of the system to avoid trapping.

As will be apparent, the booster unit may be designed with a 5-1 ratio. In other words, the exposed area of piston 16 may have such a ratio with respect to the area of piston 18. Of course, this may be varied to provide, for example, a 10-1 ratio. In this case, the driver would feel one-tenth of the resistance. These ratios may be obviously varied in numerous different respects. In any event, however, the operator will at all times have the benefit of sensing or "feeling" the reaction established by the piston 18 and so that he may intelligently control the functioning of the unit.

Due to the provision of the check valve 38, it is obvious that if the fluid pressure fails, this check valve may open upon an operator deliberately shifting rod 15. Such opening will permit fluid to flow into line 36 and break any vacuum on one or the other side of the piston 16 and which it would normally be very difficult for the driver to overcome if attempting to manually shift the parts. Of course, drainage would always be effective through line 32 and as the parts are shifted.

If the control unit is employed for military purposes, it is obvious that damage to either the supply or return lines or to the tank or pump will not impair the manual control of the unit. It is also apparent that, as afore brought out, rods 14 and 15 should preferably be of identical diameters at the points where they pass through the various packings. Due to the vents or openings 28 in the several valves, proper drainage may at all times be assured and a trapping of oil will be prevented.

Thus among other, the several objects of the invention as specifically afore noted are achieved. Obviously, numerous changes in construction and rearrangement of the parts might be resorted to without departing from the spirit of the invention as defined by the following claims.

I claim:

1. A booster unit including a pair of aligned cylinders of different cross-sectional areas arranged end to end, and each having right and left ends, pistons disposed within each of said cylinders, means whereby the piston of the smaller cylinder may be shifted under manual control, means whereby the piston of the larger cylinder may be connected to a member to be shifted, the right end of the smaller cylinder being connected to the left end of the larger cylinder and the left end of the smaller cylinder being connected to the right end of the larger cylinder whereby a continuing reaction to movement, on the part of the piston within the smaller cylinder will occur, and as the piston within the larger cylinder moves, valve means associated with the piston of the larger cylinder and connected to a source of fluid pressure, as well as, a discharge line for said fluid, said valve means controlling the flow of fluid into and from the opposite ends of both of said cylinders, and means having limited movement with respect to the piston of the larger cylinder and said valve means for connecting the piston of the smaller cylinder with said valve means to operate the latter.

2. A booster unit including a pair of aligned cylinders of different cross-sectional areas arranged end to end, each having right and left ends, pistons disposed within each of said cylinders, means whereby the piston of the smaller cylinder may be shifted under manual control, means whereby the piston of the larger cylinder may be connected to a member to be shifted, the right end of the smaller cylinder being connected to the left end of the larger cylinder and the left end of the smaller cylinder being connected to the right end of the larger cylinder whereby a continuing reaction to movement, on the part of the piston within the smaller cylinder will occur, and as the piston within the larger cylinder moves, the latter piston being formed with a chamber, valve means disposed within said chamber and connected to a source of fluid pressure, as well as, a discharge line for said fluid, said valve means controlling the flow of fluid into and from the opposite ends of both of said cylinders, and means connected to the piston of the smaller cylinder to have limited movement with respect to the piston of the larger cylinder, said latter means extending into said chamber in operative association with the valve means therein to operate the latter.

3. A booster unit including a pair of cylinders of different cross-sectional areas, each having right and left ends, pistons disposed within each of said cylinders, means whereby the piston of the smaller cylinder may be shifted under manual control, means whereby the piston of the larger cylinder may be connected to a member to be shifted, the right end of the smaller cylinder being connected to the left end of the larger cylinder and the left end of the smaller cylinder being connected to the right end of the larger cylinder whereby a continuing reaction to movement, on the part of the piston within the smaller cylinder will occur, and as the piston within the larger cylinder moves, the latter piston being formed with a chamber, valve means disposed within said chamber and connected to a source of fluid pressure, as well as, a discharge line for said fluid, said valve means controlling the flow of fluid into and from the opposite ends of both of said cylinders, said valve means comprising yieldingly supported body and head portions mounted for reciprocation, said head portions extending inwardly from opposite sides of said chamber, and means connected to the piston of the smaller cylinder and extending into said chamber to be yieldingly supported between the heads of said valve means and to operate the latter.

4. A booster unit including a pair of aligned cylinders of different cross-sectional areas arranged end to end, each having right and left ends, pistons disposed within each of said cylinders, means whereby the piston of the smaller cylinder may be shifted under manual control, means whereby the piston of the larger cylinder may connected to a member to be shifted, the adjacent ends of the small and large cylinders being directly coupled to each other, means providing a passage coupling the opposite ends of the small and large cylinders with each other, whereby a continuing reaction to movement, on the part of the piston within the smaller cylinder will occur, and as the piston within the larger cylinder moves, valve means associated with the piston of the larger cylinder and connected to a source of fluid pressure, as well as, a discharge line for said fluid, said valve means controlling the flow of fluid into and from the opposite ends of both of said cylinders, and means having limited movement with respect to the piston of the larger cylinder and said valve means for connecting the piston of the smaller cylinder with said valve means to operate the latter.

ELIAS ORSHANSKY, Jr.